// United States Patent [15] 3,647,965
Butler [45] Mar. 7, 1972

[54] COLOR PHASER FOR TELEVISION VIDEO SIGNALS

[72] Inventor: Robert John Butler, Syosset, N.Y.
[73] Assignee: RCA Corporation

[22] Filed: Apr. 1, 1969
[21] Appl. No.: 811,921

[52] U.S. Cl. ..............178/69.5 CB, 178/5.2 R, 178/69.5 DC
[51] Int. Cl. ..........H04n 9/46
[58] Field of Search............178/69.5 DC, 69.5 CB, 69.5 TV, 178/5.4 SD

[56] References Cited

UNITED STATES PATENTS

| | | | |
|---|---|---|---|
| 3,112,364 | 11/1963 | Myles | 178/69.5 |
| 3,182,128 | 5/1965 | Legler | 178/69.5 |
| 3,202,769 | 8/1965 | Coleman | 178/69.5 |
| 3,238,300 | 3/1966 | Bopp et al. | 178/69.5 |
| 3,419,681 | 12/1968 | Bopp et al. | 178/69.5 |
| 3,454,719 | 7/1969 | Horstmann et al. | 178/69.5 |
| 3,141,926 | 7/1964 | Newell | 178/69.5 |
| 3,415,949 | 12/1968 | Williams | 178/5.4 |
| 3,443,024 | 5/1969 | Allen et al. | 178/5.4 |

*Primary Examiner*—Richard Murray
*Assistant Examiner*—P. M. Pecori
*Attorney*—William H. Meagher and Eugene M. Whitacre

[57] ABSTRACT

Color video signals are applied to a delaying channel, the output of which is maintained in phase with a reference color signal by means which compares the phase of the color burst of the delayed signal with the phase of the color burst of the reference signal and changes the amount of delay of the delaying channel until there is substantially no color phase error between the compared signals.

10 Claims, 7 Drawing Figures

Patented March 7, 1972 3,647,965
5 Sheets-Sheet 1
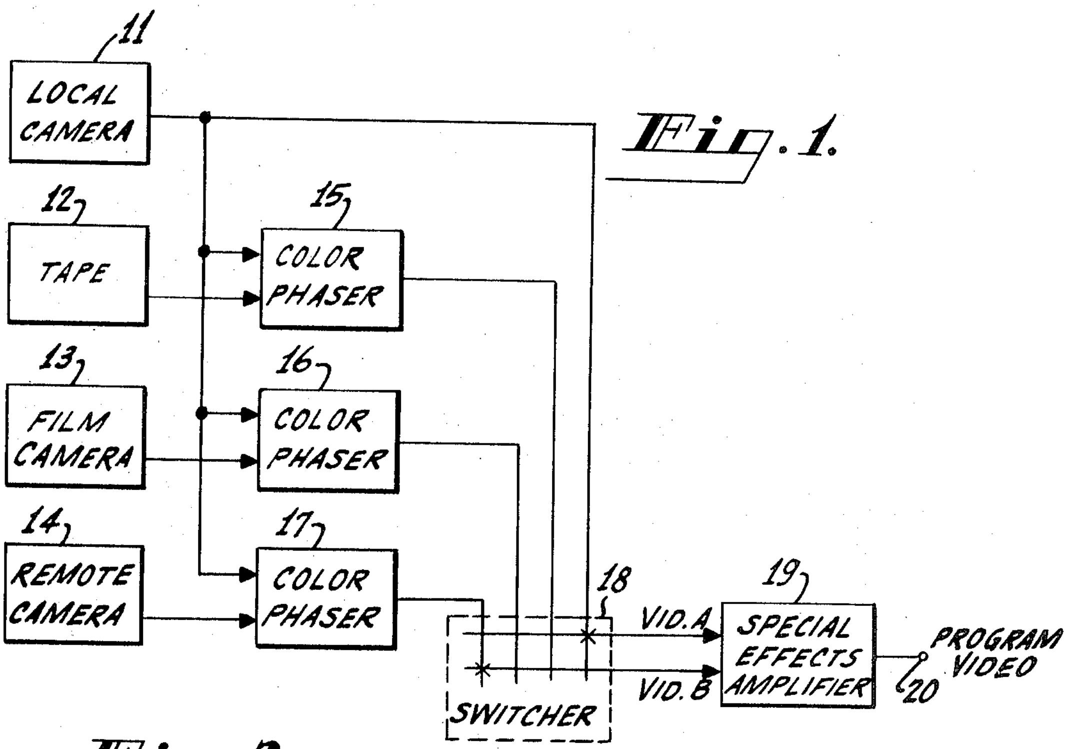
FIG. 1.
FIG. 2.
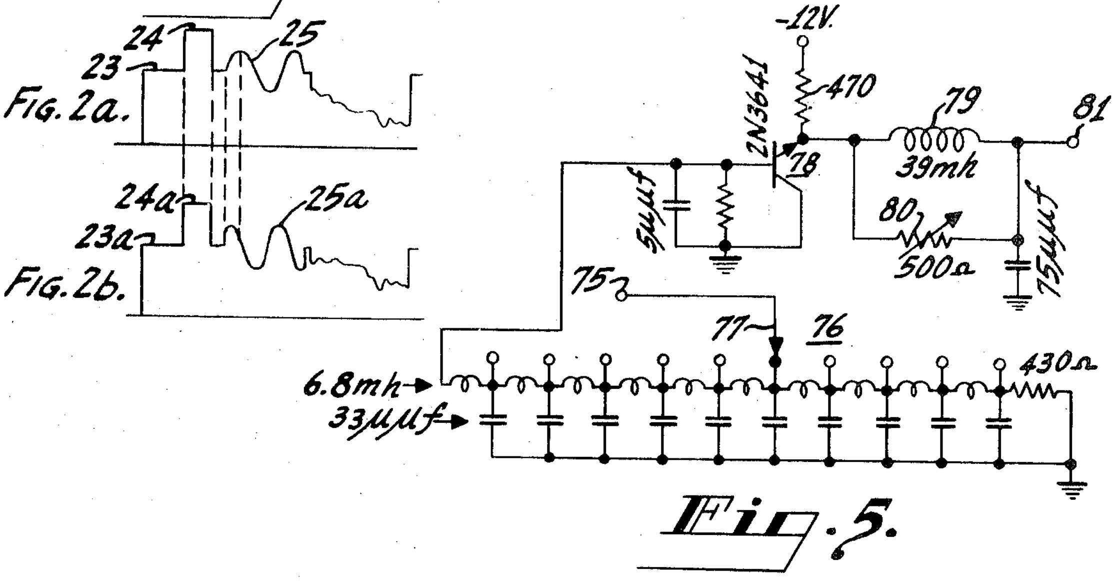
FIG. 2a. FIG. 2b. FIG. 5.
INVENTOR
ROBERT JOHN BUTLER
BY William H. Meagher
ATTORNEY Patented March 7, 1972 3,647,965

5 Sheets-Sheet 2

INVENTOR
ROBERT JOHN BUTLER

BY William H. Meagher
ATTORNEY

INVENTOR
ROBERT JOHN BUTLER

BY William H. Meagher
ATTORNEY

Patented March 7, 1972 3,647,965

5 Sheets-Sheet 4

INVENTOR
ROBERT JOHN BUTLER

BY William H. Meagher
ATTORNEY

INVENTOR
ROBERT JOHN BUTLER

BY William H. Meagher
ATTORNEY

COLOR PHASER FOR TELEVISION VIDEO SIGNALS

BACKGROUND OF THE INVENTION

This invention relates to apparatus for automatically phasing a plurality of color television signals, one of which is utilized as a reference signal.

In a television studio there are usually several sources of video signals which may be used as a source of program signals. These sources may include several live television cameras within a studio and may also include a remotely located live camera, film television camera and one or more video tape recorders. During a television program it may be necessary to switch between the various video sources or to combine several of the video sources in order to provide the desired program video signal.

It is known that apparatus must be utilized to maintain correspondence between the vertical and horizontal synchronizing pulses of the various signal sources so that switching between the various sources may be accomplished without the loss of synchronization, which would interrupt the program video which is sent to a television transmitter or a video tape recorder. The apparatus for maintaining correspondence between the vertical and horizontal synchronizing signals from the various video sources may operate manually or automatically as long as the proper synchronization of the various signals is maintained at a studio switcher.

Frequently it is desirable to mix the video from several signal sources to achieve special effects such as fading or dissolving, or to present signals from more than one source on various parts of a television picture screen. In this situation having correspondence between the vertical and horizontal synchronizing pulses of all the signals is not enough to insure a proper color television picture. This is because there is no assurance that the phase of the burst and chroma of the various signal sources will be the same. At each video signal source the phase of the subcarrier signal which is used to develop burst and chroma is arbitrary. The burst present on each television video signal is of a phase to properly demodulate its chroma signal but the burst of one signal will not properly demodulate another color signal when mixed unless the phase of all color signals is the same. When several video signals are routed through a switcher to a special effects generator for combining the two signals to form the desired program signal only one burst signal will be selected and it must serve to properly demodulate the combined video signal.

It is known that the phase of the various video signals may be adjusted so that they are in phase at the studio switcher by varying the video signal routing or by adjusting the phase of the color subcarrier to be modulated at the originating video source before the on-air program so that the signals will be in phase when it is desired to switch or combine the various signals during the program. A disadvantage of this type arrangement is that it is necessary to tieup the various signal sources before the program in order to phase the signals at the studio switcher. Further, with a manual arrangement it is necessary to utilize technical personnel at the studio switcher as well as at the remote signal sources to properly monitor and adjust the phase of the signals. This arrangement is inefficient and costly because it prevents the various signal sources from being in use continuously and because station personnel must be utilized to adjust the phasing of the signals before the program. Also, once the phase of the various video signal has been established there is no assurance that the phase will remain constant because of the effects of electronic component aging and temperature changes.

In the past automatic phasing of color signals has been attempted to overcome difficulties encountered with manual color phasing as described above. In such an arrangement several video signals may be compared with a reference color signal including a subcarrier and synchronizing pulses and the several video signals automatically phased to the external reference signal by means of automatic delaying apparatus. Such delaying apparatus may include delaying devices having an insertion delay of several hundred to several thousand nanoseconds. The delay is varied around the relatively long insertion delay. This arrangement has the disadvantage that the relatively long insertion delay will adversely affect the correspondence of the horizontal and vertical synchronizing pulses of the various video signals. Further, in prior arrangements it has been customary to adjust the variable delay by slewing from one amount of delay to another. Such slewing while the signals are being phased may be observed by television viewers as a continuous color change until the signals are properly phased.

It is an object of this invention to provide apparatus for automatically phasing a plurality of color television signals.

Color television video signals are applied to a delaying channel including a plurality of discrete delaying devices. The signals obtained from the delaying channel are processed to separate the burst from the video signals, the burst being coupled to a first input terminal of a phase discriminator. A reference signal, which may be another color television video signal, is processed to separate its burst component which is coupled to another input terminal of the phase discriminator. An error signal corresponding to the sense and magnitude of the phase difference between the video and reference bursts is derived from the discriminator and coupled to two amplifiers having respective thresholds for phase errors above a selected magnitude in each sense direction. An error signal exceeding a threshold of one of the amplifiers develops a control voltage at an output terminal of the amplifier. The control voltages are coupled to a bidirectional binary counter to control its operation. The output terminals of each counter stage are coupled to respective ones of the discrete delay devices which are inserted or removed from the video signal delaying channel according to the operation of the counter until there is substantially no color phase difference between the video signals and the reference signals.

In a preferred embodiment of the invention the synchronizing pulses of the input video signals and the reference signals are used to generate gates which are compared with each other for time coincidence. Coincidence of the gates produces a signal which, along with the presence of a burst on the video signal indicating a color signal, enables the counter to operate. A manually selectable delay is inserted in the reference signal channel to allow a reference phase to be selected as desired.

A more detailed disclosure of an embodiment of the invention is given in the following description taken in conjunction with the accompanying drawings of which:

FIG. 1 illustrates an arrangement of television studio equipment utilizing the invention;

FIG. 2 illustrates color television waveforms derived from separate video sources;

FIG. 5 is a circuit diagram of a reference signal delay network illustrated in FIG. 4;

DESCRIPTION OF THE INVENTION

Figure 3:
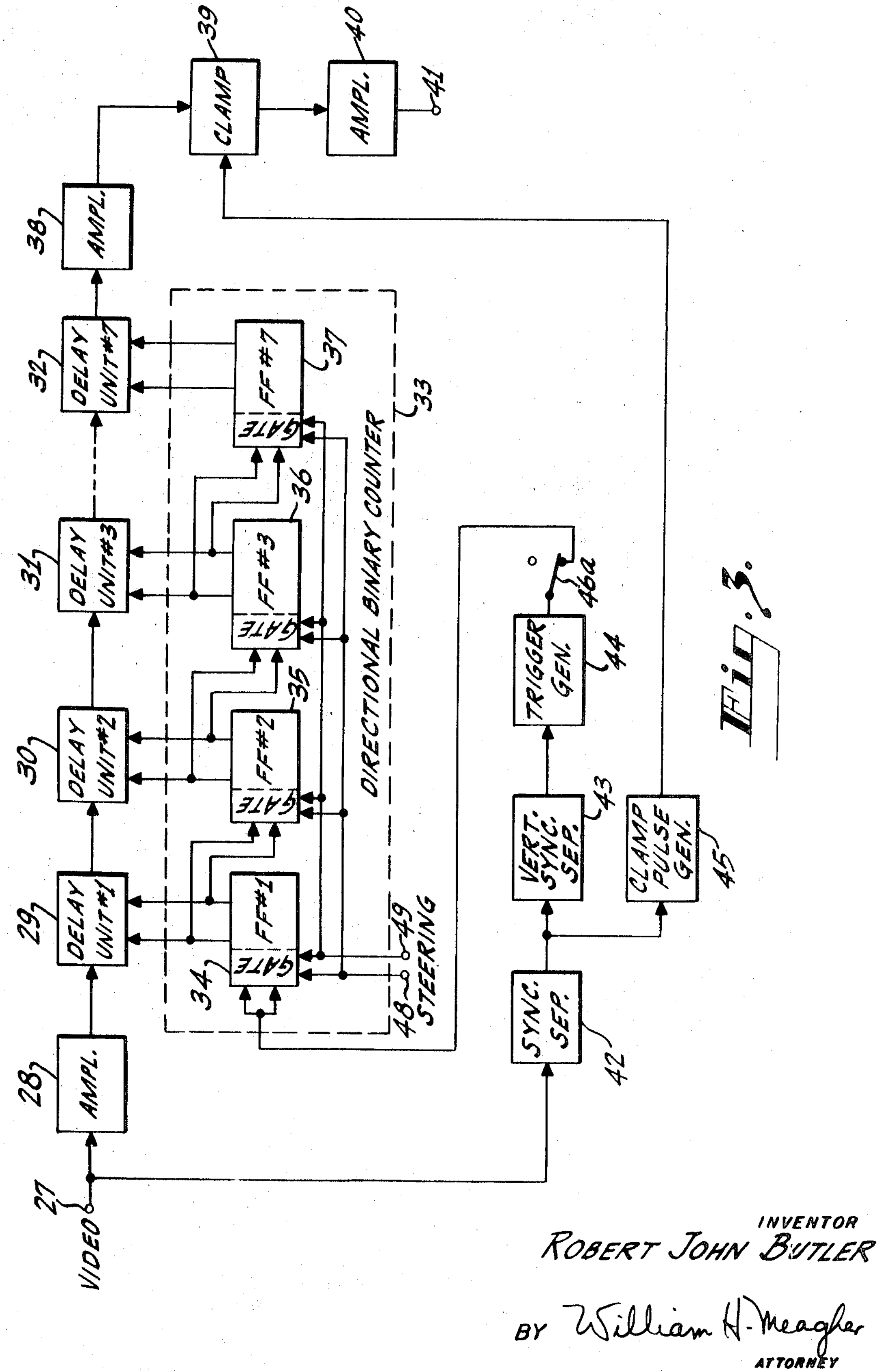
FIG. 3 is a functional block diagram of a delaying apparatus according to the invention.

FIG. 1 illustrates an arrangement of television studio equipment utilizing the invention. Sources of video signals including a local studio television camera 11, a video tape machine 12, a television film camera 13 and a remotely located camera 14 may all be used separately or in conjunction with one another during a television program. The video signal from local camera 11 is coupled to an input line of studio switcher 18. Video tape machine 12 is coupled to an input of a color phaser 15, film camera 13 is coupled to an input of a color phaser 16, and remotely located camera 14 is coupled to an input terminal of a color phaser 17. The video signals obtained from output terminals of color phasers 15, 16 and 17 are coupled to other input lines of studio switcher 18. Studio switcher 18 may be controlled so that the two output busses may be switched to any of the input lines. In FIG. 1 video signal A at the output of studio switcher 18 is the composite video signal from local camera 11 and video signal B is the signal obtained from the color phaser 17. The video A and video B output busses are coupled to a special effects amplifier 19 in which video signals A and B may be combined to form a program video signal which is obtained at output terminal 20 of special effects amplifier 19.

The composite video output signal of local camera 11 is also coupled to input terminals of color phasers 15, 16 and 17 to serve as a reference color signal. The purpose of color phasers 15, 16 and 17 will be described in conjunction with FIG. 2.

FIGS. *2a* and *2b* illustrate two composite video waveforms 23 and 23*a* which may represent, for example, the video signals obtained from local camera 11 and remotely located camera 14 of FIG. 1. Video waveform 23 contains a pulse component 24 representative of the television synchronizing pulse portion of the waveform, and a color burst portion 25. Normally, each color television video signal contains a burst of eight or more cycles representing the color subcarrier phase located on the portion of the video waveform following the synchronizing pulses. For purposes of illustration, only a portion of the eight or more cycles of the burst portion is shown on waveform 23 of FIG. *2a*. The waveform 23*a* of FIG. *2b* is similar to waveform 23 of FIG. *2a* except the burst portion 25*a* is shown to have a different phase relative to the burst portion 25 of video waveform 23. Although not illustrated, it is understood that apparatus has been utilized to ensure that the synchronizing pulse portions 24 and 24*a* of the two video waveforms 23 and 23*a* are coincident with each other. One manner of aligning the synchronizing pulse portions is by the use of "genlock" apparatus.

As is shown on waveforms 23 and 23*a*, the burst portions 25 and 25*a* are not necessarily in phase with each other even through the synchronizing pulses are coincident. This is because the phase setting of the subcarrier at each video signal source such as camera 11 and camera 14 of FIG. 1 is arbitrary. Further, if the burst portions were adjusted to be in phase with each other, a change in the length of the respective video paths to the switcher, for example, could shift the phase of one signal with respect to the other.

While the burst portion of each of video waveforms 23 and 23*a* is of the proper phase to demodulate its respective chroma signals the burst of one signal, being of out of phase with the chroma of the other, could not demodulate the chroma of the other signal without producing erroneous color signals. Therefore, when it is desired to mix two video signals, apparatus must be provided to ensure that the color phase of both video signals is substantially the same.

The purpose of color phasers 15, 16 and 17 of FIG. 1 is to adjust automatically the phase of the color signals obtained from tape machine 12, film camera 13 and remotely located camera 14 to match the color phase of local camera 11 so that when any combination of these video signal sources is selected by the switcher to be mixed in special effects amplifier 19 a combined video signal having the proper color phase may be obtained at output terminal 20 of the amplifier 19. In FIG. 1 the color signal from camera 11 is used as the reference color signal. It is to be understood that any color signal may be utilized as a reference signal.

FIG. 3 is a functional block diagram illustrating the delaying channel of the color phaser. A source of video signals including synchronizing pulse, burst and chroma components are applied to an input terminal 27. Terminal 27 is coupled to an amplifier 28 which drives a first delay unit 29. Connected in series with delay unit 29 are delay units 30, 31 and 32. For purposes of illustrating the invention delaying units four through six have been omitted from the diagram, but their operation and connection is similar to the delay units to be described.

The total delay of delay units 29 through 32 is equal to 360° of the color subcarrier frequency, or approximately 280 nanoseconds. The delay time of delay 32 is equal to 180 degrees of the subcarrier or 140 nanoseconds. The delay of delay unit 30 is one-half the delay time of delay unit 31, each preceding delay unit having a delay equal to one-half of the delay of the next succeeding delay unit. Delay unit 29 has the smallest delay, the delay being equal to 2.8° of the subcarrier waveform. The various delays of delay units 29 through 32 are switched in and out of the delay path by operation of a bidirectional binary counter 33. A schematic diagram of a typical delay unit and its associated counting stage will be described in conjunction with FIG. 6.

The output of delay unit 32 is coupled through an amplifier 38 to a clamp 39. Clamp 39 removes undesired DC components of the video signals which may result from switching of delay units 29–32. The clamped video signals are coupled through an amplifier 40 to a terminal 41.

The video signals coupled to input terminal 27 are also coupled to a sync separator 42 which separates the synchronizing pulses from the composite video signal in a conventional manner. The synchronizing signals are coupled to a clamp pulse generator 45 which generates clamping pulses at the synchronizing signal rate. The clamping pulses are coupled to the clamp 39.

The synchronizing signals from sync separator 42 are also coupled to a vertical synchronizing separator 43 which separates the vertical synchronizing pulses from the horizontal synchronizing pulses in a conventional manner. The vertical synchronizing pulses are coupled to a trigger generator 44, the output of which is coupled through relay contacts 46*a* to both of the counting trigger inputs of a first counter stage 34 of the binary counter 33. The trigger pulses for each of the succeeding counter stages 35, 36 and 37 are obtained from the outputs of its respective preceding counter stage. Counter steering control signals are applied to terminals 48 and 49 and are coupled to the respective steering input terminals of all of the counter stages 34–37. The counting triggers and the steering control signals are coupled to a gating portion of the counter stages. The gating portion is shown in circuit form in FIG 6.

Figure 4:
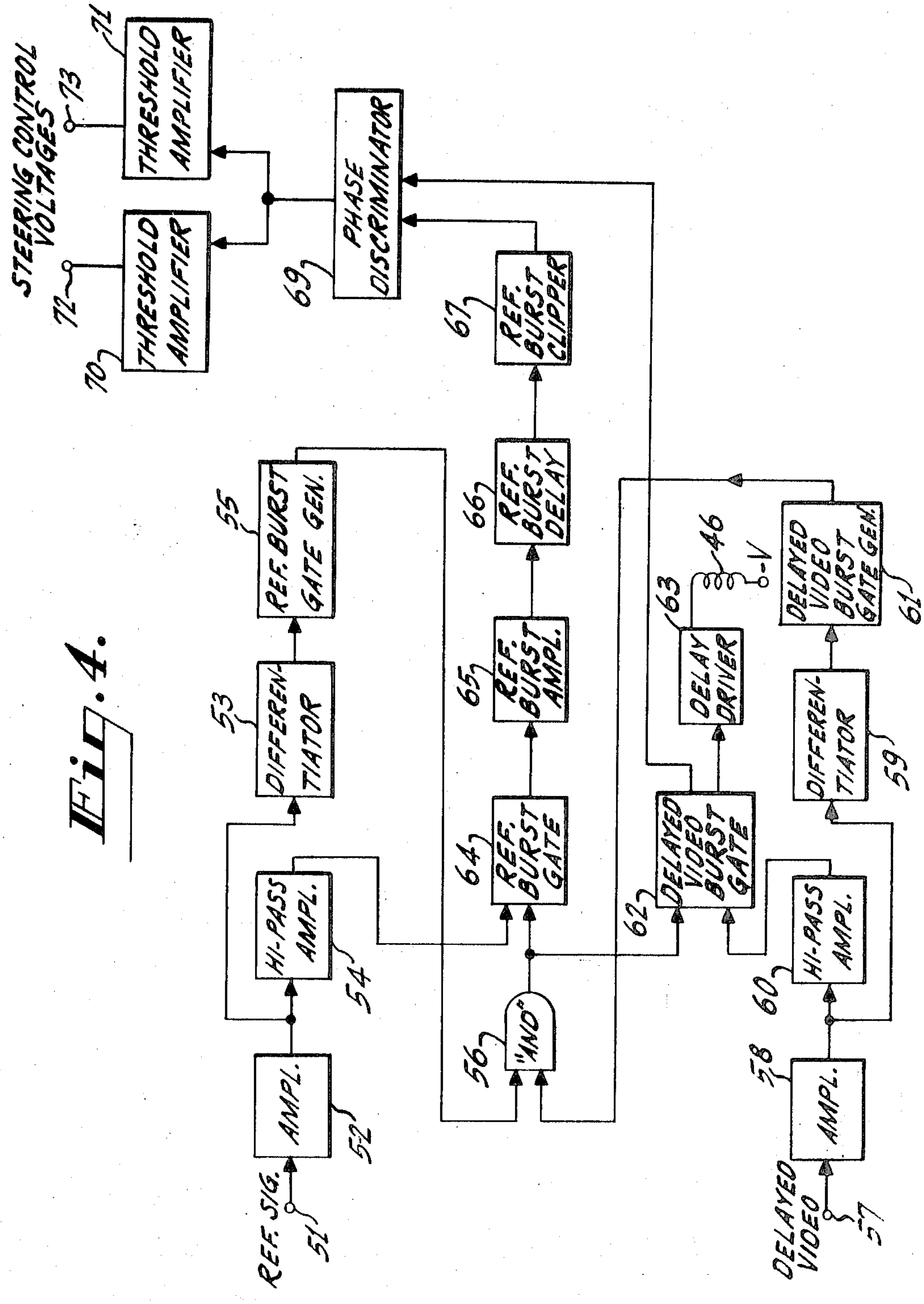
FIG. 4 is a functional block diagram of a delaying apparatus control unit according to the invention.

Referring to FIG. 4, a functional block diagram of the counter control portion of the color phaser is shown. Delayed video signals obtained from output terminal 41 of FIG. 3 are coupled to an input terminal 57. Terminal 57 is coupled to an amplifier 58. The composite video signal obtained from amplifier 58 is coupled to a differentiating network 59 which reproduces only the leading and trailing edge portions of the synchronizing pulse components of the composite video signal. The trailing edge components are coupled to a delayed video burst gate generator 61 which generates a burst gate having a width equal to approximately eight cycles of the subcarrier frequency or approximately 2.4 microseconds. This burst gate is coupled to an input terminal of AND-gate 56. A reference color signal which may be any color signal such as the composite video signal obtained from local camera 11 of FIG. 1 is coupled to an input terminal 51. The reference signal at terminal 51 is coupled through an amplifier 52 and to a differentiating network 53 which reproduces only the leading and trailing edges of the synchronizing pulse components of the reference video signal. The trailing edges of the synchronizing pulse components are coupled to a reference burst gate generator 55. The width of the reference burst gate is equal to eight cycles of the subcarrier frequency or approximately 2.4 microseconds. The reference burst gates are coupled to another input terminal of AND-gate 56. An enabling pulse is developed at the output of AND-gate 56 when the burst gates from burst gate generators 55 and 61 are in time coincidence. As will be described subsequently, the purpose of the AND gate is to enable operation of the color phaser only when the synchronizing pulses of the reference video signal and the input video signal are coincident within the time period represented by four cycles of the subcarrier frequency. The pulse obtained from AND gate 56 is coupled to the delayed video burst gate 62. Also coupled to the delayed video burst gate 62 is the video signal obtained from high pass amplifier 60. When both the burst portion of the delayed video signal and the AND gate enabling pulse are present, the delayed video burst gate 62 will operate to pass a control signal to relay driver 63 and to pass the burst of the delayed video signal on to an input of phase discriminator 69.

Relay driver 63 energizes relay 46 when the reference and delayed video signals are within four cycles of burst coincidence. The contacts of relay 46 are shown as contacts 46*a* in FIG. 3. Thus, the counter trigger pulses from trigger generator 44 of FIG. 3 will not be coupled to the counter 33 unless the reference video signal and the delayed video signal have their synchronizing pulses in time coincidence and the delayed video signal has a burst component, indicating it is a color video signal.

An enabling pulse obtained from AND-gate 56 is also coupled to an input terminal of a reference burst gate 64. The reference signal from amplifier 52 is coupled to a high pass amplifier 54 which, similar to high pass amplifier 60, passes only the burst portions of the signal. The burst from high pass amplifier 54 is coupled to an input terminal of reference burst gate 64. With both input signals present the reference burst will be passed through gate 64 on to reference burst amplifier 65. The amplified reference burst is then coupled to a reference burst delay 66 to establish a reference phase. A schematic diagram of reference burst delay 66 will be described in conjunction with FIG. 5. The reference burst is coupled from delay 66 to a clipper 67 which clips both the upper and lower portions of the burst. The clipped reference burst is coupled to another input terminal of discriminator 69. The signal obtained from phase discriminator 69 is an error signal proportional to the phase difference between the reference burst and the delayed video burst.

The error signal obtained from phase discriminator 69 is applied in parallel to respective input terminals of threshold amplifiers 70 and 71. Each of amplifiers 70 and 71 has an adjustable threshold control which is adjusted so that the error signal will not be passed unless it exceeds the respective threshold voltages. Threshold amplifier 71 is similar to threshold amplifier 70 except for an additional inverting stage. The threshold controls of the respective amplifiers are adjusted such that the signal obtained from the output terminal of each amplifier will be zero volts when the error signal exceeds its respective threshold setting. In the absence of an error signal exceeding the thresholds, the output signals at terminals 72 and 73 are −12 volts. Thus, the steering control voltages at terminals 72 and 73 will remain at −12 volts until the phase error signal crosses the threshold of an amplifier, at which time the output control voltage of that amplifier will be zero volts. A circuit diagram of threshold amplifiers 70 and 71 will be described subsequently in conjunction with FIG. 7.

The operation of the color phaser will be described in conjunction with FIGS. 3 and 4. Video signals applied to video input terminal 27 of FIG. 3 are to be phased with the reference signal applied to reference signal terminal 51 of FIG. 4. The video signals applied to terminal 27 are delayed an amount equal to whatever delay units 29–32 are initially switched into the delaying channel. The initially delayed video signals are obtained from terminal 41 of FIG. 3 and are coupled to delayed video input signal terminal 57 of FIG. 4. As previously described, a delayed video burst gate pulse is generated from the synchronizing components of the video signal coupled to terminal 57 and this pulse is coupled to one input of AND-gate 56. A similar burst gate pulse is generated from the synchronizing pulse components of the reference color signal applied to input terminal 51 and this reference burst gate pulse is coupled to the other input of AND-gate 56. When the two burst gate pulses are time coincident, an enabling pulse will be developed at the output of AND-gate 56 and applied to reference burst gate 64 and delayed video burst gate 62. If the video signal applied to input terminal 57 is a color video signal, it will contain burst, which, together with the enabling pulse from AND-gate 56, will develop a control signal to cause relay driver 63 to energize relay 46. Relay 46 closes the contacts 46*a* of FIG. 3 to allow counting pulses to be applied to bidirectional binary counter 33.

In the presence of the enabling pulse from AND-gate 56 the burst of the delayed video signal applied to terminal 57 will be coupled to an input terminal of phase discriminator 69.

The enabling pulse from AND-gate 56 will also allow the reference burst to pass through reference burst gate 64 and through reference burst amplifier 65 to reference burst delay 66. The delay time of reference burst delay 66 is selected to establish a reference phase of the reference burst. The delayed reference burst is coupled through reference burst clipper 67 to the other input of phase discriminator 69. The output of phase discriminator 69 is proportional to the direction and magnitude of the phase difference between the burst of the delayed video and reference signals. This error signal is applied to threshold amplifiers 70 and 71 which provide counter steering control signals at terminals 72 and 73. These control signals are applied to terminals 48 and 49 of FIG. 3 to provide steering control for counter 33. The steering control voltages will determine whether the counter will increase or decrease its count, a zero volt steering control signal enabling the counter and a −12 volt steering control voltage disabling the counter.

The video applied to video input terminal 27 of FIG. 3 is applied to sync separator 42 which separates the synchronizing pulse components from the video. As previously described, the synchronizing pulses are used to trigger clamp pulse generator 45 which provides clamp pulses applied to clamp 39. The vertical synchronizing signals are separated in vertical synchronizing separator 43 and applied to trigger generator 44. When relay contacts 46*a* are closed as shown the trigger pulses derived from trigger generator 44 are coupled to the first counter stage 34, producing a change in state if either steering voltage is at zero potential. Thus, the counting action of counter 33 is accomplished at the field rate during blanking intervals. The binary counter 33 controls the discrete delay units 29 through 32 which delay units are inserted or removed from the delaying channel in a binary manner as counter 33 operates. It should be noted that the insertion or removal of a discrete delay unit is accomplished during the blanking interval and is therefore not visible on a television viewing screen.

The total delay of delay units 29–32 is equal to the period of one cycle of the subcarrier frequency or approximately 280 nanoseconds. The delay time of delay unit 32 is equal to one-half the period of the subcarrier frequency and each preceding delay unit has a delay equal to one-half the period of the next succeeding delay unit. The smallest delay unit, delay unit 29, has a delay time equal to approximately 2.8° of subcarrier frequency. This smallest delay is equal to the least significant bit of the counter 33. With seven delay units as illustrated it can be seen that the total delay combinations which can be achieved is $2^7$ or 128 different delay combinations. The control signals applied to terminals 48 and 49 are such as to cause counter 33 and delay units 29–32 to add or subtract amounts of delay from the video signal delaying channel until the phase of the delayed video signal at terminal 41, which is coupled to terminal 57 of FIG. 4, is in phase with the burst of the reference signal applied to terminal 51 when both signals arrive at the input terminals of phase discriminator 69.

FIG. 5 illustrates a delay network which is represented by the reference burst delay block 66 in FIG. 4. The reference signals are applied to terminal 75 and coupled through a number of delay segments of delay line 76 as determined by the setting of course delay switch 77. The signals are taken from delay line 76 and applied to the base electrode of transistor 78. A vernier delay circuit comprising inductor 79, capacitor 74 and resistor 80 is in the emitter circuit of transistor 78. The delay signal is taken from output terminal 81. The values shown for the delay line 76 are such as to provide a delay of plus or minus 90° of the reference burst from the center position of delay switch 77.

Figure 6:
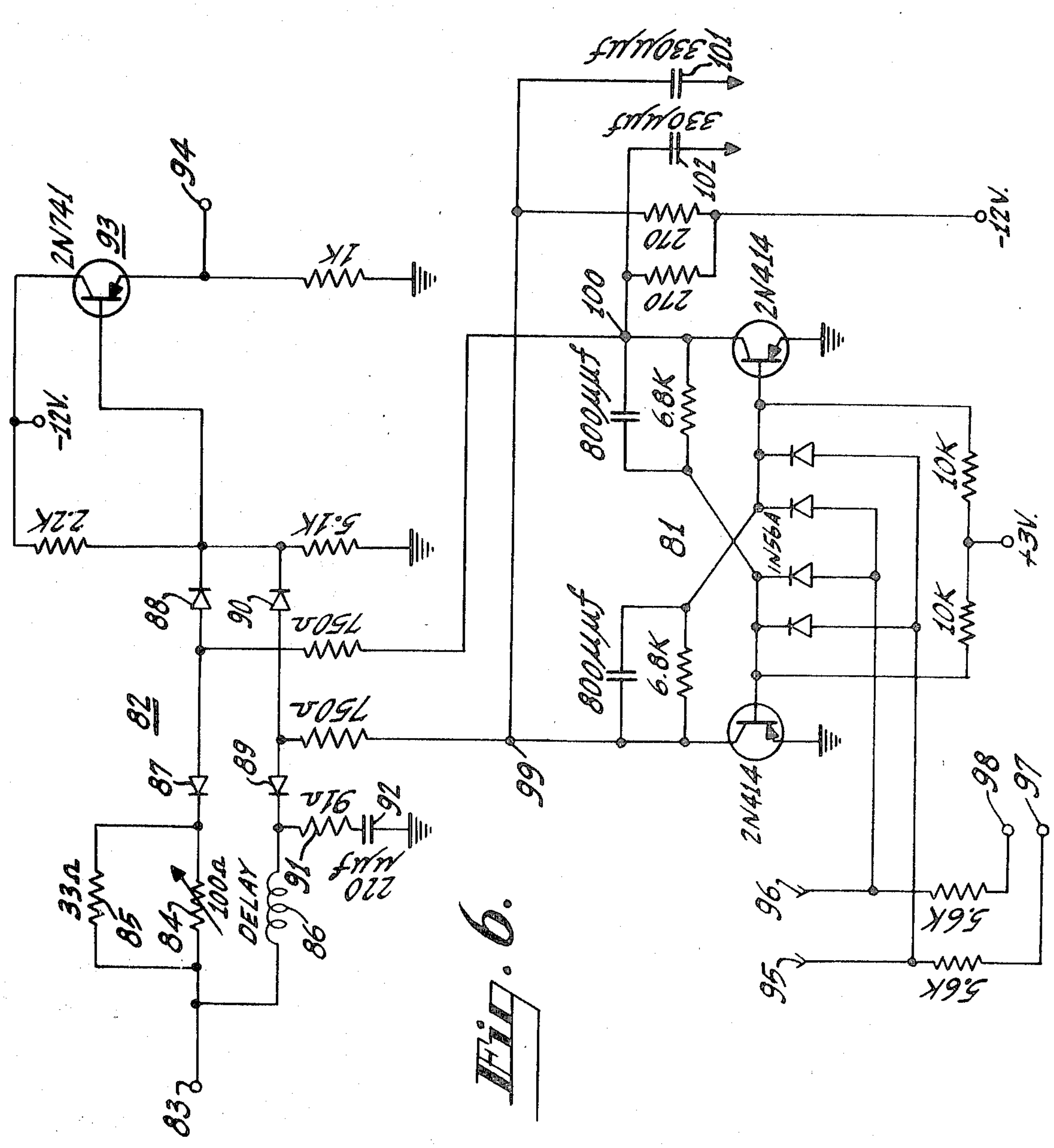
FIG. 6 is a circuit diagram of a discrete delay unit illustrated in FIG. 3.

FIG. 6 illustrates a combination of a counter stage 81 and a delay unit 82 which is representative of each of the counter stages and its associated delay unit as shown in FIG. 3. The video signal to be delayed is coupled to terminal 83. The video may then take one of two paths to the base of transistor 93. A first path is through the delay unit 86; the second path is through parallel resistors 84 and 85. The paths which the signal will take is dependent on which pair of diodes, 87–88 or 89–90, is forward biased. Bias voltages for the diodes are provided by the voltages appearing at output terminals 99 and 100 of counter stage 81.

Counter stage 81 is a conventional flip-flop, which is controlled by the triggers applied to terminals 95 and 96 from the previous counting stage, and by the steering voltages of zero or −12 volts applied to steering terminals 97 and 98. A steering voltage of zero volts coupled to terminals 97 or 98 will allow the next positive trigger to be passed by the diode gate and the counter. The voltages at output terminals 99 and 100 of counter 81 are either at zero or −12 volts.

Zero volts at output terminal 99 will forward bias diodes 88 and 90 and allow the signals from input terminal 83 to pass through delay line 86 to the base of emitter follower transistor 93 and appear at a delay unit output terminal 94. Alternatively, zero volts at terminal 100 of counter 81 will forward bias diodes 87 and 88 and allow the video signals at terminal 83 to pass through parallel resistors 84 and 85 to output terminal 94.

Delay unit 86 comprises a length of 75 ohm coaxial cable, the length of the cable determining the amount of delay. The cable is terminated by resistor 91, capacitor 92 and the other circuit elements which provide a 75 ohm termination for delay cable 86 so there will be no reflections of the delay signal back to terminal 83.

Potentiometer 84 in parallel with resistor 85 is adjusted so that the signal arriving at the base of transistor 93 is of the same amplitude for whichever path the signal takes.

The counter stage output signals from terminals 99 and 100 are coupled through capacitors 101 and 102 to trigger the next succeeding counter stage in conjunction with the steering control voltages.

Figure 7:
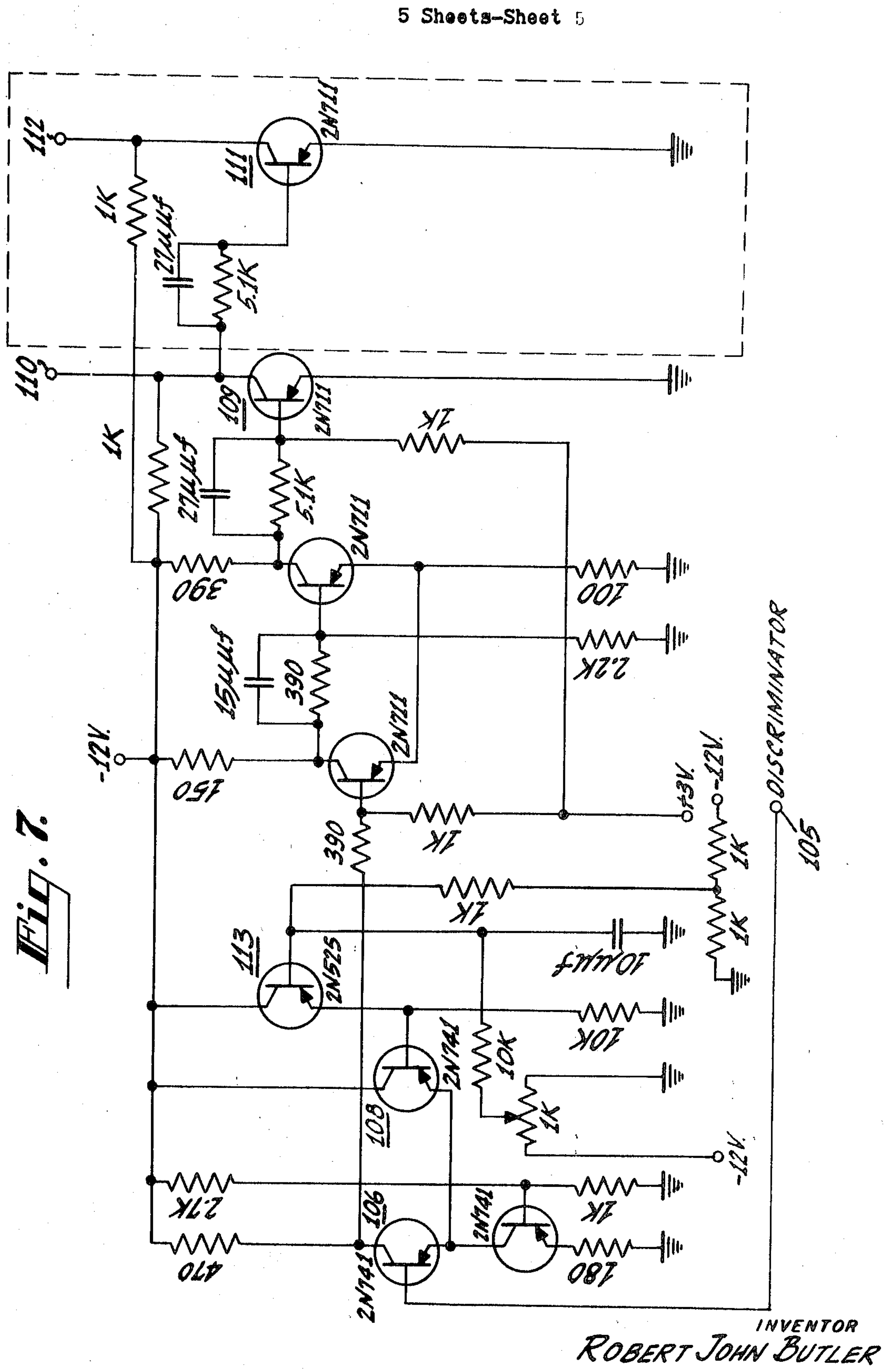
FIG. 7 is a circuit diagram of a threshold amplifier illustrated in FIG. 4.

FIG. 7 is a circuit diagram of threshold amplifiers 70 and 71 of FIG. 4. The phase error voltage from discriminator 69 is coupled to input terminal 105 of the threshold amplifier. Input terminal 105 is coupled to the base electrode of transistor 106. A threshold voltage for the amplifier is selected by adjusting the wiper arm of potentiometer 107 which provides bias for transistor 113. The threshold voltage is coupled through emitter follower stage 113 to the base electrode of transistor 108. Transistors 108 and 106, and the current source transistor 116, comprise a differential amplifier. When the phase error signal at the base electrode of transistor 106 is more negative than the threshold voltage appearing at the base of transistor 108, the threshold amplifier output voltage obtained at terminal 110 will be −12 volts. When the phase error voltage appearing at terminal 105 is more positive than the threshold voltage appearing at the base of transistor 108, the control voltage appearing at terminal 110 will be zero volts. As previously described in conjunction with FIG. 6, zero volts appearing at output terminal 110 will enable the counter stages to be triggered. Terminal 110 is coupled to a steering control input terminal of counter 33 of FIG. 3. The portion of the threshold amplifier shown within the dotted lines is an additional inverting stage 115 which is a part of threshold amplifier 71 but not threshold amplifier 70. The output signal appearing at terminal 112 is inverted from the signal appearing at terminal 110, i.e., when terminal 110 is at zero volts terminal 112 will be −12 volts.

The maximum count of the counter corresponds to 360° of one cycle of the subcarrier frequency, after which the next count corresponds to zero degrees of subcarrier frequency. The insertion delay of the delaying channel is approximately 20 nanoseconds. Therefore, the maximum that the video signal can be displaced in time is 280 nanoseconds (one cycle of subcarrier frequency) plus 20 nanoseconds insertion delay, or a maximum total of 300 nanoseconds. This maximum offset is not enough to adversely affect the coincidence of the two video signals to the extent that synchronization between the signals is lost.

What has been disclosed is apparatus for automatically phasing one or more color video signals to a color reference signal. The color video signal to be phased with the reference signal is delayed in discrete increments up to a maximum delay equal to the period of one cycle of burst, the time of which represents the full color range of a color television signal. The entire video signal is delayed, but the phase comparison is made only between the bursts of the reference and video signals. An error signal corresponding to any color phase difference between the reference and video signals is applied in parallel to two threshold amplifiers, one of which senses an error signal representative of the video phase leading the reference phase and the other of which senses an error signal representative of the video phase lagging the reference phase. For either condition, the respective amplifier develops a control voltage which is utilized to steer the counter, i.e., to enable the counter to increase or decrease its count. The counter stages control the switching in or out of the discrete delay units in the delaying channel until the phase differences between the video and reference signals coupled to the phase discriminator input terminals is substantially zero. The smallest delay unit utilized in the described embodiment of the invention has a delay time equal to the period of 2.8° of one cycle of color subcarrier. It has been determined that color signals differing in phase by this amount may be mixed without any objectionable color error. However, it is to be understood that another counter stage and associated delay unit may be utilized with the described apparatus so that the smallest switchable delay will have a delay equal to the period of 1.4° of the color subcarrier.

What is claimed is:

1. In a television system, apparatus for phasing a plurality of color video signals comprising:

a delaying channel;

means coupling video signals including a burst of color subcarrier frequency and chroma and synchronizing pulse components to said delaying channel;

a source of reference signals including a burst of color subcarrier frequency and synchronizing pulse components;

phase error detection means for providing a phase error signal proportional to the color subcarrier phase difference of two signals applied thereto;

means coupling said video signals obtained from said delaying channel and said reference signals to said phase error detection means and for enabling said phase error detection means during the presence of said bursts of color subcarrier frequency;

means responsive to said phase error signals for providing control signals;

bidirectional binary counter means coupled to said delaying channel for controlling the amount of delay therein;

means for separating said synchronizing pulse components from said video signals and for coupling said pulses to said counter means for causing said counter to operate; and means coupling said control signals to said counter means for controlling the operation of said counter and said delaying channel to reduce the color phase error between said video signals and said reference signals.

2. Apparatus for phasing a plurality of color video signals according to claim 1 wherein said delaying channel includes a plurality of discrete delay devices serially connected and said bidirectional counter means operates to switch said discrete delay devices in and out of said delaying channel.

3. Apparatus for phasing a plurality of color video signals according to claim 2 wherein the maximum selectable delay of said delaying channel is equal to the period of one cycle of said subcarrier frequency.

4. Apparatus for phasing a plurality of color video signals according to claim 3 wherein the longest delay time of said discrete delay device is equal to the period of one half a cycle of said subcarrier frequency and the delay time of each of the shorter discrete delay devices is one-half the delay time of the next longer discrete delay time.

5. Apparatus for phasing a plurality of color video signals according to claim 4 wherein said counter means switches said discrete delay devices in and out of said delaying channel in a binary manner.

6. Apparatus for phasing a plurality of color video signals according to claim 5 wherein said means responsive to said phase error signal includes means responsive to the sense and magnitude of said phase error signal for providing control signals for increasing and decreasing the binary count of said counter means and thereby increasing or decreasing the delay time of said delaying channel.

7. Apparatus for phasing a plurality of color signals according to claim 6 wherein said means coupling said video signals and said reference signals to said detecting means includes means for separating said synchronizing pulse components from said video and reference signals and for developing gates from said synchronizing signals for applying to a coincidence circuit which activates said phasing apparatus when said gates are in time coincidence.

8. Apparatus for phasing a plurality of color signals according to claim 7 wherein said coupling means includes gate circuits responsive to said gates and said reference and video signals for allowing only said burst portions of said signals to be coupled to said phase error detection means.

9. Apparatus for phasing a plurality of color signals according to claim 8 wherein said means responsive to said phase error signals includes two amplifiers having thresholds adjustable such that said amplifiers provide control signals for said counter means only when said error signals exceed said thresholds.

10. In a television system, apparatus for automatically delaying a color television video signal relative to a reference signal comprising:

delaying means including a plurality of discrete delay devices;

means coupling a source of color television video signals including color burst, chroma and synchronizing components to an input terminal of said delaying means;

delayed video signal processing means for separating said burst and synchronizing components from said delayed signal;

means coupling said video signal from an output terminal of said delaying means to said delayed video signal processing means;

said delayed video signal processing means including means for generating a delayed video burst gate from an edge of said synchronizing component of said delayed video signal;

reference signal processing means for separating the burst and synchronizing components of a reference signal applied thereto;

said reference signal processing means including reference delay means for establishing a reference phase of said burst component of said reference signal and means for generating a reference burst gate from an edge of said synchronizing component of said reference signal;

means for generating an enabling pulse when said reference burst gate and said delayed video burst gate applied thereto are in time coincidence;

means coupling said enabling pulse to a reference burst gate for allowing said reference burst to pass therethrough;

means coupling said enabling pulse to a delayed video burst gate for allowing said delayed video burst to pass therethrough;

a color subcarrier burst phase discriminator;

means coupling said reference burst and said delayed video burst to said phase discriminator for providing an error signal corresponding to the magnitude and direction of any phase difference between said reference and video bursts;

first and second threshold amplifiers for providing output control signals corresponding to error signals applied thereto;

means coupling said error signal to said first and second threshold amplifiers to develop said control signals;

bidirectional binary counter means coupled to said delaying means;

means coupling said control signals to said counter means to enable said counter means to increase or decrease its count;

means for producing triggers from said synchronizing pulse components of said video signal;

means coupling said triggers to said counter means to cause said counter to count at the rate of said triggers when said counter is enabled by said control signals whereby said counter means effectively adds or subtracts said discrete delay means from said delaying means to cause said video signal obtained from said delaying means to have the same color phase as said reference signal.

* * * * *